April 6, 1954     W. H. B. COWAN     2,674,141
BOTTLE OPENING ATTACHMENT FOR CAR BUMPERS
Filed Nov. 4, 1952
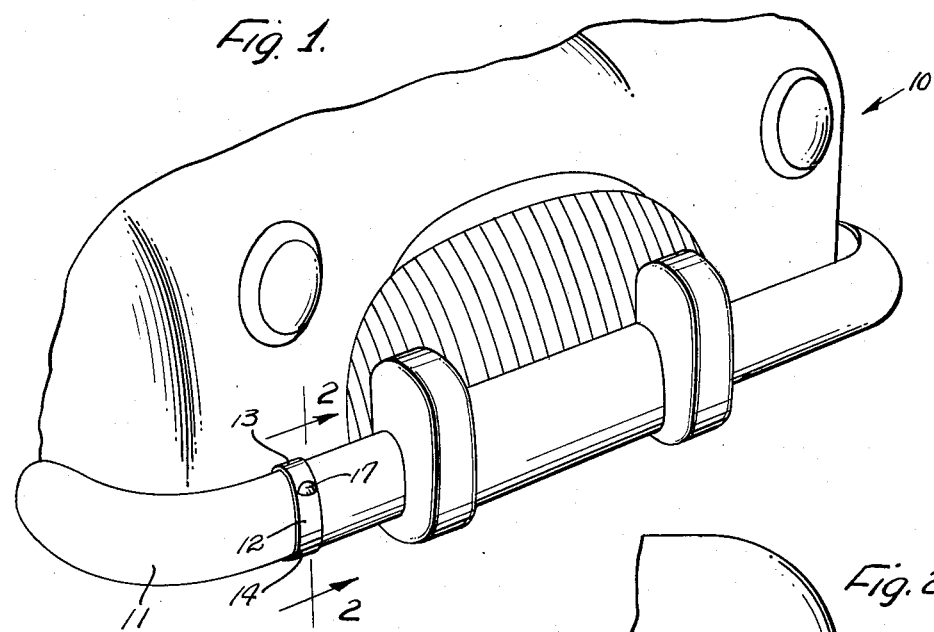
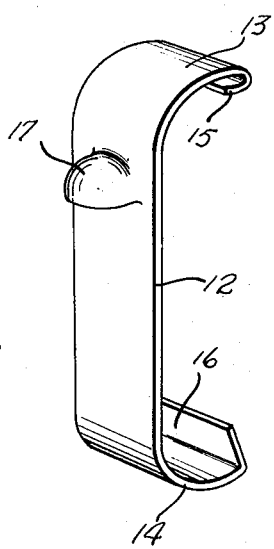
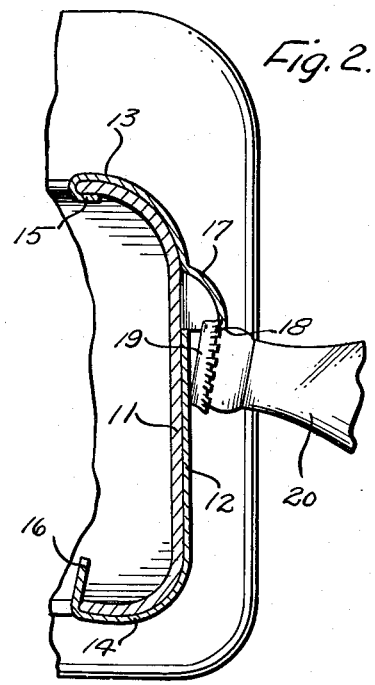
INVENTOR
William H B Cowan Patented Apr. 6, 1954

2,674,141

UNITED STATES PATENT OFFICE 2,674,141

BOTTLE OPENING ATTACHMENT FOR CAR BUMPERS

William H. B. Cowan, Mississippi City, Miss.

Application November 4, 1952, Serial No. 318,559

1 Claim. (Cl. 81—3.3)

The present invention relates to a bottle opening attachment for car bumpers and it consists in the combinations, constructions and arrangements of parts herein described and claimed.

Generally there is provided an attachment for the bumpers of an automobile which may be quickly and easily applied to such bumper and which attachment is provided with means whereby a conventional crimp-type cap may be removed from a bottle thus providing a convenience to autoists as a permanent adjunct to an automobile.

It is accordingly an object of the invention to provide a device of the character set forth which is simple in construction, inexpensive to manufacture and yet effective and efficient in use.

Another object of the invention is to provide a device of the character set forth having novel means for mounting the same upon the bumper of an automobile.

A further object of the invention is to provide a device of the character set forth which may be formulated of a single piece of spring metal.

Other and further objects of the invention will become apparent from a reading of the following specification taken in conjunction with the drawing, in which:

Figure 1 is a perspective view of an embodiment of the invention mounted upon the bumper of an automobile, Figure 2 is an enlarged sectional view taken along 2—2 of Figure 1, and Figure 3 is an enlarged perspective view of the device shown in Figures 1 and 2.

Referring more particularly to the drawings, there is shown therein an automobile generally indicated at 10 and provided with a front bumper 11. The device comprising the present invention consists of a single piece of flat spring metal having a vertically extending body portion 12 which is provided with an inwardly and rearwardly extending upper portion 13 and an inwardly and rearwardly extending lower portion 14.

The inner end of the portion 13 is provided with a forwardly and downwardly extending lip 15 while the rearward end of the portion 14 has integrally formed therewith a generally upwardly extending latch member 16.

A hood 17 is formed integrally in the upper portion of the body 12 as by punching or stamping and is provided with a lip 18 at its lower end.

In operation, it will be apparent that the lip 15 may be engaged over the upper edge of the bumper 11 and thereafter the clamp 16 may be guarded over the lower end of the bumper 11 and allowed to clamp itself into position thus holding the entire device rigidly upon the bumper 11. When it is desired to remove a cap 19 from a bottle 20, it is only necessary to place the cap beneath the lip 18 and press the bottle 20 downwardly in conventional manner whereupon the cap 19 will be forcibly removed from the neck of the bottle 20, likewise in conventional manner.

It will be apparent that the device, when once mounted upon the bumper 11 may be allowed to remain in place at all times so that the occupants of the vehicle 10 may have this convenience whenever desired.

While but one form of the invention has been shown and described herein, it will be readily apparent to those skilled in the art that many minor modifications may be made without departing from the spirit of the invention or the scope of the appended claim.

What is claimed is:

A bottle opening attachment for automobile bumpers comprising a vertically-extending spring metal body adapted to lie on the forward face of the bumper, a rearwardly extending upper portion for said body, a lip at the rear end of said upper portion adapted to engage with the upper edge of the bumper, a rearwardly-extending lower portion for said body, an upwardly extending clamp member formed at the rear of said lower portion and adapted to engage the lower edge of the bumper, and a cap-engaging hood formed integrally in said vertically extending body and extending forwardly therefrom and disposed near the rearwardly extending upper portion.

References Cited in the file of this patent

UNITED STATES PATENTS

| Number | Name | Date |
|---|---|---|
| 862,372 | Alexander | Aug. 6, 1907 |
| 1,090,422 | Stovall et al. | Mar. 17, 1914 |
| 2,033,098 | Fink | Mar. 3, 1936 |
| 2,347,734 | Cowan | May 2, 1944 |